(12) United States Patent
Kuwamori et al.

(10) Patent No.: US 11,906,678 B2
(45) Date of Patent: Feb. 20, 2024

(54) SEISMIC OBSERVATION DEVICE, SEISMIC OBSERVATION METHOD, AND RECORDING MEDIUM ON WHICH SEISMIC OBSERVATION PROGRAM IS RECORDED

(71) Applicants: NEC CORPORATION, Tokyo (JP); JAPAN AGENCY FOR MARINE-EARTH SCIENCE AND TECHNOLOGY, Yokosuka (JP)

(72) Inventors: Naoki Kuwamori, Tokyo (JP); Narumi Takahashi, Yokosuka (JP); Masaru Nakano, Yokosuka (JP); Kentaro Sueki, Yokosuka (JP); Shuichiro Yada, Yokosuka (JP); Yoko Kuwamori, Yokosuka (JP)

(73) Assignees: NEC CORPORATION, Tokyo (JP); JAPAN AGENCY FOR MARINE-EARTH SCIENCE AND TECHNOLOGY, Yokosuka (JP)

( * ) Notice: Subject to any disclaimer, the term of this patent is extended or adjusted under 35 U.S.C. 154(b) by 59 days.

(21) Appl. No.: 17/631,195

(22) PCT Filed: Jul. 28, 2020

(86) PCT No.: PCT/JP2020/028855
§ 371 (c)(1),
(2) Date: Jan. 28, 2022

(87) PCT Pub. No.: WO2021/033501
PCT Pub. Date: Feb. 25, 2021

(65) Prior Publication Data
US 2022/0276400 A1 Sep. 1, 2022

(30) Foreign Application Priority Data
Aug. 20, 2019 (JP) .................. 2019-150630

(51) Int. Cl.
*G01V 1/28* (2006.01)
*G01V 1/00* (2006.01)
*G01V 1/137* (2006.01)

(52) U.S. Cl.
CPC ............... *G01V 1/28* (2013.01); *G01V 1/003* (2013.01); *G01V 1/008* (2013.01); *G01V 1/137* (2013.01)

(58) Field of Classification Search
CPC .......... G01V 1/28; G01V 1/003; G01V 1/008; G01V 1/137; G01V 2210/1232; H04W 4/38; H04W 4/90
See application file for complete search history.

(56) References Cited

U.S. PATENT DOCUMENTS

| | | | |
|---|---|---|---|
| 5,373,486 A | 12/1994 | Dowla et al. | |
| 5,490,062 A | 2/1996 | Leach et al. | |

(Continued)

FOREIGN PATENT DOCUMENTS

| | | |
|---|---|---|
| CN | 108021922 A | 5/2018 |
| CN | 110065077 A | 7/2019 |

(Continued)

OTHER PUBLICATIONS

Hsu et al., Two Novel Approaches to Reduce False Alarm Due to Non-Earthquake Events for On-Site Earthquake Early Warning System, 2016, Computer-Aided Civil and Infrastructure Engineering 31, pp. 535-549 (Year: 2016).*

(Continued)

*Primary Examiner* — Toan M Le
(74) *Attorney, Agent, or Firm* — Sughrue Mion, PLLC

(57) ABSTRACT

A seismic observation device includes an input unit receiving input of time-series data of measurement values of a vibration, a processing target determination unit determining a time period of the time-series data that is a processing (Continued)

target, and a type determination unit acquiring a likelihood of classifying a cause of the vibration indicated in the time-series data in the time period into each of types of cause.

7 Claims, 9 Drawing Sheets

(56) References Cited

U.S. PATENT DOCUMENTS

| | | |
|---|---|---|
| 2006/0023569 A1 | 2/2006 | Agullo et al. |
| 2010/0274492 A1 | 10/2010 | Rentsch et al. |

FOREIGN PATENT DOCUMENTS

| | | |
|---|---|---|
| JP | 10-19654 A | 1/1998 |
| JP | 2003-516516 A | 5/2003 |
| JP | 2007-198813 A | 8/2007 |
| JP | 2008-107225 A | 5/2008 |
| JP | 2010-237153 A | 10/2010 |
| JP | 2012-216158 A | 11/2012 |
| JP | 2014-203184 A | 10/2014 |
| JP | 2016-156712 A | 9/2016 |
| JP | 2017-151047 A | 8/2017 |
| JP | 2019-125306 A | 7/2019 |
| WO | 97/22892 A1 | 6/1997 |

OTHER PUBLICATIONS

S. Scarpetta et al., "Automatic Classification of Seismic Signals at Mt. Vesuvius Volcano, Italy, Using Neural Networks", Bulletin of the Seismological Society of America, 2005, pp. 185-196, 2005, vol. 95, No. 1.

Edoardo Del Pezzo et al., "Discrimination of Earthquakes and Underwater Explosions Using Neural Networks", Bulletin of the Seismological Society of America, Feb. 2003, pp. 215-223, vol. 93, No. 1.

International Search Report for PCT/JP2020/028855, dated Oct. 27, 2020.

Office Action dated Dec. 13, 2022 issued by the Japanese Patent Office in Japanese Application No. 2021-540695.

* cited by examiner

FIG. 3
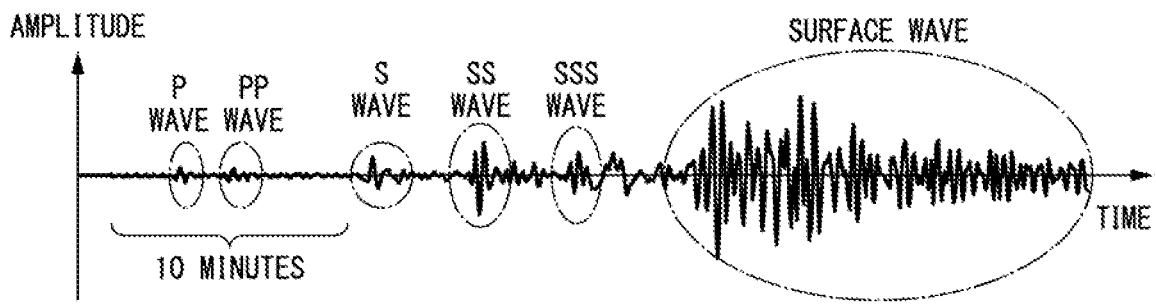
FIG. 4
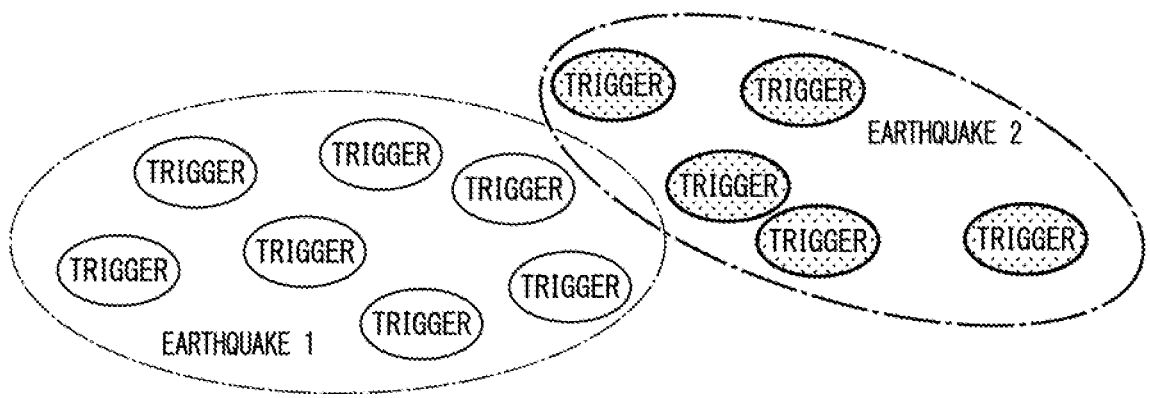
FIG. 5
| | NEAR-FIELD EARTHQUAKE | FAR-FIELD EARTHQUAKE | LOW FREQUENCY EARTHQUAKE | ARTIFICIAL EARTHQUAKE | MICRO-EARTHQUAKE | VOLCANIC EARTHQUAKE |
|---|---|---|---|---|---|---|
| TRIGGER A | 0.89 | 0.57 | 0.91 | 0.21 | 0.98 | 0.52 |
| TRIGGER B | 0.29 | 0.35 | 0.14 | 0.97 | 0.80 | 0.23 |
| TRIGGER C | 0.63 | 0.44 | 0.92 | 0.32 | 0.65 | 0.91 |

FIG. 6

| OUTPUT / INPUT | NEAR-FIELD EARTHQUAKE | FAR-FIELD EARTHQUAKE | LOW FREQUENCY EARTHQUAKE | ARTIFICIAL EARTHQUAKE | MICRO-EARTHQUAKE | VOLCANIC EARTHQUAKE |
|---|---|---|---|---|---|---|
| NEAR-FIELD EARTHQUAKE | 1 | | | | | |
| FAR-FIELD EARTHQUAKE | | 1 | | | | |
| LOW FREQUENCY EARTHQUAKE | | | 1 | | | +0.7 |
| ARTIFICIAL EARTHQUAKE | | | | 1 | | |
| MICRO-EARTHQUAKE | | | | | 1 | |
| VOLCANIC EARTHQUAKE | | | -0.5 | | | 1 |

SEISMIC OBSERVATION DEVICE, SEISMIC OBSERVATION METHOD, AND RECORDING MEDIUM ON WHICH SEISMIC OBSERVATION PROGRAM IS RECORDED

CROSS REFERENCE TO RELATED APPLICATIONS

This application is a National Stage of International Application No. PCT/JP2020/028855 filed Jul. 28, 2020, claiming priority based on Japanese Patent Application No. 2019-150630 filed Aug. 20, 2019, the contents of which are incorporated herein by reference.

TECHNICAL FIELD

The present invention relates to a seismic observation device, a seismic observation method, and a recording medium on which a seismic observation program is recorded.

BACKGROUND ART

In relation to detection of an earthquake, Patent Document 1 discloses a vibration alarm device that performs machine learning to distinguish whether a generated vibration is an earthquake or a daily vibration. This vibration alarm device calculates a feature amount of a vibration or the like measured from acceleration measurement data of the vibration by an acceleration sensor, and determines whether the generated vibration is an earthquake or a daily vibration on the basis of the feature amount. In order to perform such a determination, this vibration alarm device performs machine learning on the relationship between the measured feature amount of the vibration and the vibration determination result.

PRIOR ART DOCUMENTS

Patent Documents

[Patent Document 1]
Japanese Unexamined Patent Application, First Publication No. 2016-156712

SUMMARY OF INVENTION

Problems to be Solved by the Invention

In vibration observation, it may be desirable to distinguish between other types without limitation to distinguish whether a generated vibration is an earthquake or a daily vibration. For example, in a case where a far-field earthquake and a near-field earthquake are observed at approximately the same time, it is necessary to distinguish between a seismic wave of the far-field earthquake and a seismic wave of the near-field earthquake in order to obtain the hypocenter of each earthquake.

An object of the present invention is to provide a seismic observation device, a seismic observation method, and a recording medium on which a seismic observation program is recorded, capable of solving the above problem.

Means for Solving the Problems

According to a first aspect of the present invention, there is provided a seismic observation device including input means for receiving input of time-series data of measurement values of a vibration; processing target determination means for determining a time period of the time-series data that is a processing target; and type determination means for acquiring a likelihood of classifying a cause of the vibration indicated in the time-series data in the time period into each of types of cause.

According to a second aspect of the present invention, there is provided a seismic observation method including receiving input of time-series data of measurement values of a vibration; determining a time period of the time-series data that is a processing target; and acquiring a likelihood of classifying a cause of the vibration indicated in the time-series data in the time period into each of types of cause.

According to a third aspect of the present invention, there is provided a recording medium on which a seismic observation program is recorded, the program causing a computer to receive input of time-series data of measurement values of a vibration; determine a time period of the time-series data that is a processing target; and acquire a likelihood of classifying a cause of the vibration indicated in the time-series data in the time period into each of types of cause.

Advantageous Effects of the Invention

According to the present invention, it is possible to perform more flexible distinguishing without limitation to distinguish whether a generated vibration is an earthquake or a daily vibration.

BRIEF DESCRIPTION OF DRAWINGS

FIG. 3 is a graph illustrating an example of a seismic wave.

FIG. 4 is a diagram illustrating an example of a distribution of triggers in a seismic wave.

FIG. 5 is a table illustrating an example of a likelihood for each type of event according to the embodiment.

FIG. 6 is a table illustrating examples of coefficients used for a determination integration processing unit according to the embodiment to correct a likelihood.

EXAMPLE EMBODIMENTS

Hereinafter, embodiments of the present invention will be described. The following embodiments do not limit the invention according to the claims. Not all combinations of features described in the embodiments are essential to solving means of the invention.

Figure 1:
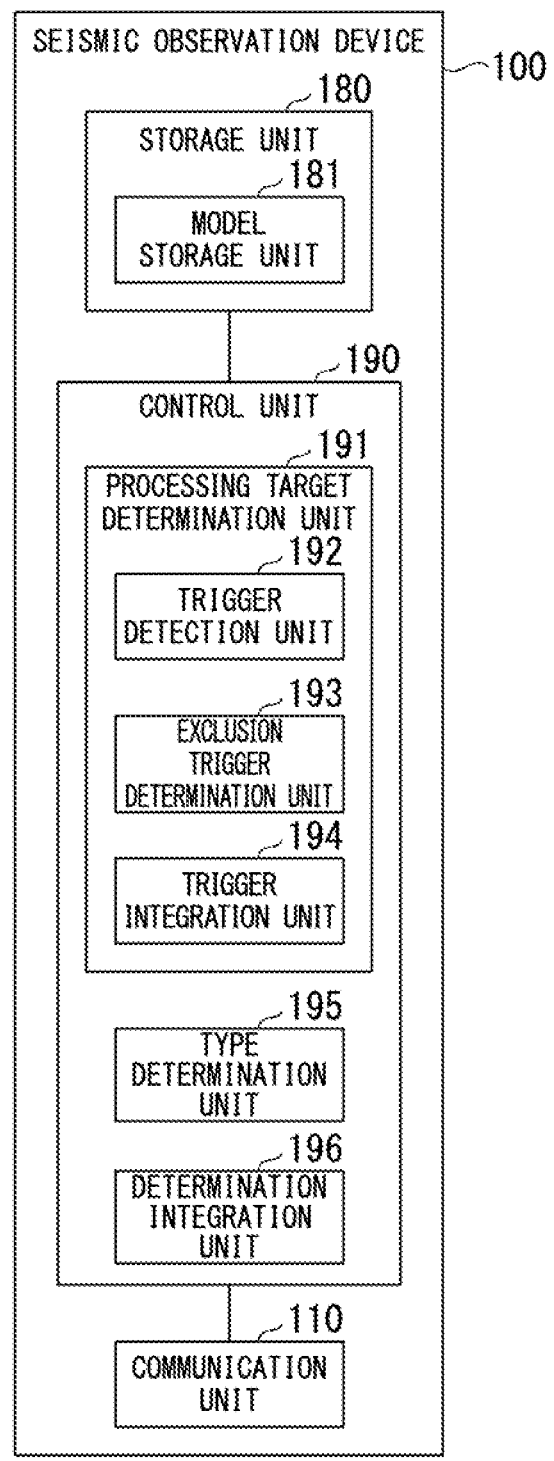
FIG. 1 is a block diagram illustrating an example of a functional configuration of a seismic observation device according to an embodiment.

FIG. 1 is a schematic block diagram illustrating an example of the functional configuration of the seismic observation device according to the embodiment. As illustrated in FIG. 1, a seismic observation device 100 includes a communication unit 110, a storage unit 180, and a control unit 190. The storage unit 180 includes a model storage unit 181. The control unit 190 includes a processing target determination unit 191, a type determination unit 195, and a determination integration processing unit 196. The processing target determination unit 191 includes a trigger detection unit 192, an exclusion trigger determination unit 193, and a trigger integration unit 194.

The seismic observation device 100 acquires sensor measurement values from sensors such as seismographs installed at observation points, and detects a vibration different from normal vibrations on the basis of the vibrations indicated by the sensor measurement values. The seismic observation device 100 determines the detected vibration (sensor data indicating the detected vibration) as a processing target in seismic observation, and predicts the cause of the vibration.

The seismic observation device 100 is configured by using a computer such as a workstation or a mainframe.

The above observation point is a point where a sensor for observing shaking such as an earthquake is installed. The observation point will also be referred to as a seismic observation point or a seismic intensity observation point.

A vibration that is different from a normal vibration that occurs in daily life will also be referred to as a trigger. As described above, when a vibration different from a normal vibration is detected, the seismic observation device 100 performs a process for seismic observation on the vibration. In this respect, a vibration different from a normal vibration is a trigger for the seismic observation device 100 to perform a process for seismic observation.

Determining the presence or absence of the vibration different from normal vibration will also be referred to as determining a trigger.

When a trigger is detected, the seismic observation device 100 predicts the type of cause causing the trigger (that is, a cause causing a vibration different from a normal vibration). Specifically, the seismic observation device 100 calculates a likelihood of a cause causing a trigger being classified into types thereof for each of preset types of cause of vibration.

For example, in a case where a plurality of earthquakes with different cause of vibrations occur at approximately the same time, such as far-field earthquakes and near-field earthquakes, it is possible to distinguish between a plurality of earthquakes by referring to estimation results of the cause of vibrations, and thus it can be expected that the hypocenter of each earthquake will be able to be predicted.

The cause of vibration (event that causes the vibration) will be referred to as an event.

A plurality of types of sensors may be installed at one observation point. By providing a plurality of sensors having different sensitive frequency bands at one observation point, the seismic observation device 100 can determine a trigger over a wide frequency width. For example, the seismic observation device 100 can determine a trigger with relatively high accuracy over a wide frequency width, such as determining a trigger due to a normal earthquake and a trigger due to a low frequency earthquake with relatively high accuracy. Here, a normal earthquake is an earthquake having a higher frequency than that of a low frequency earthquake. The term "normal earthquake" is used to distinguish it from a low frequency earthquake.

The observation point may be provided in water such as the sea, a lake, or a river. In this case, a water pressure gauge may be installed at the observation point. For example, an accelerometer and a water pressure gauge may be installed at an observation point on the seabed. By providing the observation point in water, the seismic observation device 100 can determine a trigger even in water.

It is possible to distinguish between a primary wave (P wave) and a secondary wave (S wave) relatively easily and with high accuracy by using a water pressure gauge as a sensor. The P wave that is a longitudinal wave (compressional wave) propagates in water, but the S wave that is a transverse wave does not propagate in water. On the basis of this property, a vibration detected by both a vibrometer (for example, an accelerometer) and a water pressure gauge can be determined as being the P wave, and a vibration detected by the vibrometer but not detected by the water pressure gauge can be determined as being the S waves. Consequently, the P wave and the S wave can be distinguished between.

The observation point may be provided with not only a vibration sensor but also a sensor such as a wind power sensor for measuring weather information. The seismic observation device 100 can determine a trigger with higher accuracy by referring to the weather information. For example, in a case where the waves are high due to strong winds on the sea surface, a water pressure gauge installed on the seabed detects changes in water pressure due to the influence of the waves. In this case, the seismic observation device 100 may refer to a wind power value measured by the sensor, and when the wind power is strong, exclude a water pressure gauge on the seabed at that location from seismic detection. Consequently, it is possible to reduce the possibility of erroneously detecting a change in water pressure due to the influence of wind as a vibration due to an earthquake.

The seismic observation device 100 may be used to predict the hypocenter of an earthquake.

Figure 2:
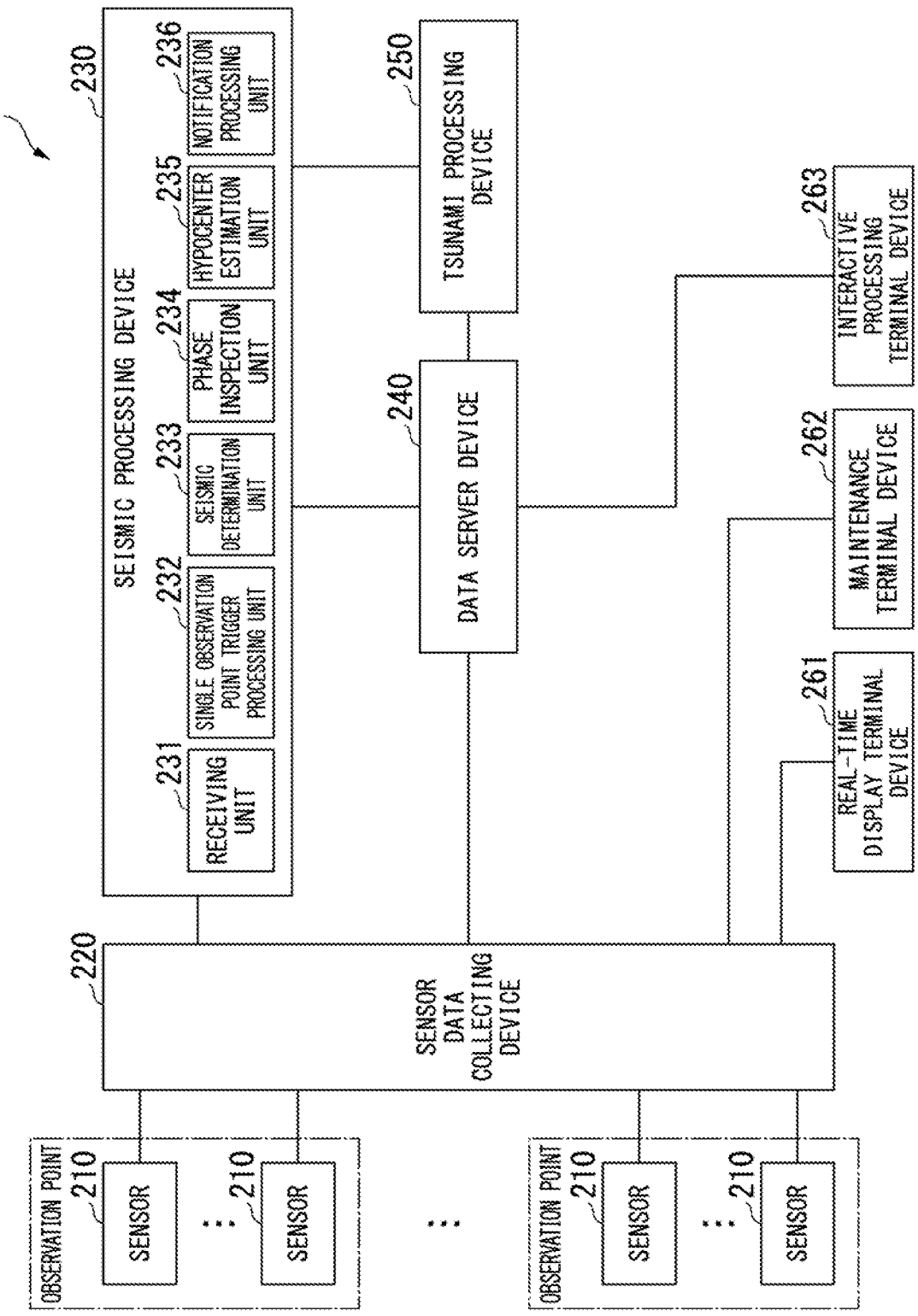
FIG. 2 is a block diagram illustrating an example of a functional configuration of a seismic processing system according to the embodiment.

FIG. 2 is a schematic block diagram illustrating an example of a functional configuration of a seismic processing system 1 according to the embodiment. In the configuration illustrated in FIG. 2, the seismic processing system 1 includes a sensor 210, a sensor data collecting device 220, a seismic processing device 230, a data server device 240, a tsunami processing device 250, a real-time display terminal device 261, and a maintenance terminal device 262, and an interactive processing terminal device 263. The seismic processing device 230 includes a receiving unit 231, a single observation point trigger processing unit 232, a seismic determination unit 233, a phase inspection unit 234, a hypocenter estimation unit 235, and a notification processing unit 236.

The seismic processing device 230, the tsunami processing device 250, and the data server device 240 are configured by using a computer such as a workstation or a mainframe.

The seismic processing system 1 reports a seismic early warning when an earthquake occurs. In the seismic processing system 1, the sensor data collecting device 220 collects measurement data from the sensor 210 installed at the observation point, transmits the collected data to the seismic processing device 230, and registers the collected data in the data server device 240.

The seismic processing device 230 determines whether or not an earthquake has occurred on the basis of the measurement data from the sensor 210. In a case where it is determined that an earthquake has occurred, the seismic processing device 230 predicts the hypocenter (seismic source) and notifies a notification destination of an estimation result together with tsunami information from the tsunami processing device 250. The notification destination here may be, for example, a terminal device of a person in charge of seismic analysis, or an organization that reports seismic information such as a television station.

The receiving unit 231 receives the measurement data from the sensor 210 from the sensor data collecting device 220 and outputs the data to each unit in the subsequent stage.

The single observation point trigger processing unit 232 determines a trigger for each observation point on the basis of the measurement data from the sensor 210. Each observation point will also be referred to as a single observation point.

The seismic determination unit 233 determines whether or not an earthquake has occurred on the basis of the determination results of triggers at a plurality of observation points. For example, the seismic determination unit 233 determines that an earthquake has occurred in a case where a proportion of the observation points at which a trigger derived from an earthquake has been determined is equal to or higher than a predetermined proportion among observation points included in a predetermined range.

In a case where the seismic determination unit 233 determines an earthquake has occurred, the phase inspection unit 234 inspects seismic waves (for example, a P wave, an S wave, and a T wave) at respective phases. An existing method may be used as an inspection method.

In a case where the seismic determination unit 233 determines that an earthquake has occurred, the hypocenter estimation unit 235 predicts the hypocenter on the basis of the inspection results of the phase inspection unit 234. An existing method may be used as the method for estimating the hypocenter.

In a case where the seismic determination unit 233 determines that an earthquake has occurred, the notification processing unit 236 notifies a predefined notification destination of the hypocenter predicted by the hypocenter estimation unit 235 and the tsunami information generated by the tsunami processing device 250.

The data server device 240 stores various data related to seismic observation, such as measurement data from the sensor 210. The data server device 240 stores parameter values for the seismic processing device 230 to perform various processes. For example, in a case where the seismic processing device 230 performs a process in each unit by using a trained model based on machine learning, the data server device 240 may store model parameter values of machine learning results.

The tsunami processing device 250 predicts the presence or absence of occurrence of a tsunami in a case where the seismic determination unit 233 determines that an earthquake has occurred. A well-known method may be used as a method for the tsunami processing device 250 to predict the presence or absence of occurrence of a tsunami. The tsunami processing device 250 transmits tsunami information indicating an estimation result of the presence or absence of a tsunami to the notification processing unit 236. As described above, the notification processing unit 236 collectively notifies the notification destination of the hypocenter information and the tsunami information.

The real-time display terminal device 261 displays the measurement data from the sensor 210 in real time.

The maintenance terminal device 262 is a terminal device for maintenance of the seismic processing system 1. For example, a maintenance worker of the seismic processing system 1 uses the maintenance terminal device 262 to update the model parameter values stored in the data server device 240. The maintenance worker of the seismic processing system 1 checks whether or not each of the sensors 210 is operating normally by using the maintenance terminal device 262, and performs maintenance of the sensor 210 as necessary.

The interactive processing terminal device 263 interactively presents a part of processing by the seismic processing system 1 that requires manual processing to a user and receives processing by the user. For example, in a case where the user processes the inspection of the phase inspection unit 234, the interactive processing terminal device 263 may display information for inspection such as a seismic waveform and receive the processing by the user.

Among the constituents of the seismic processing system 1, the single observation point trigger processing unit 232 is correlated with the seismic observation device 100. The seismic observation device 100 may perform the processing of the single observation point trigger processing unit 232. In that case, the seismic processing device 230 may be configured as one device, and the seismic observation device 100 and a part of the seismic processing device 230 may be correlated with each other. Alternatively, the seismic processing device 230 may be configured as a plurality of devices including the seismic observation device 100.

The communication unit 110 of the seismic observation device 100 (FIG. 1) communicates with other devices. For example, the communication unit 110 acquires measurement data (vibration measurement values) from a sensor such as a seismograph installed at an observation point. In particular, the communication unit 110 repeatedly acquires the vibration measurement values using a predetermined cycle, for example, every $1/100$ seconds. As a result, it can be said that the communication unit 110 receives the input of time-series data of the vibration measurement value. The communication unit 110 corresponds to an example of an input unit.

The communication unit 110 may directly receive the measurement data from the sensor. Alternatively, the communication unit 110 may receive the measurement data in the sensor via a device other than the sensor, such as the sensor data collecting device collecting the measurement data in the sensor and transmitting the measurement data to the seismic observation device 100.

The storage unit 180 stores various data. The storage unit 180 is configured by using the storage device included in the seismic observation device 100.

The model storage unit 181 stores a trained model. The trained model referred to here is a model obtained through machine learning. The model storage unit 181 may store trained models for some or all of processes of the trigger detection unit 192, the exclusion trigger determination unit 193, the trigger integration unit 194, the type determination unit 195, and the determination integration processing unit 196. The model storage unit 181 stores a trained model obtained as a result of machine learning.

For example, the model storage unit 181 may store a model including parameters and parameter values obtained through machine learning as a trained model. The model including the parameters may be a neural network such as a convolutional neural network (CNN), but is not limited thereto.

The model storage unit 181 may store a plurality of trained models for one functional unit. For example, in a case where processing by the trigger detection unit 192 is a target of machine learning, the model storage unit 181 may store a trained model used for the trigger detection unit 192 to determine a trigger for each type of trigger that will be described later.

The control unit 190 controls each unit of the seismic observation device 100 to execute various processes. A function of the control unit 190 is executed by a central processing unit (CPU) included in the seismic observation device 100 reading a program from the storage unit 180 and executing the program.

The processing target determination unit 191 determines a time period of time-series data that is a processing target in the time-series data of the vibration measurement values (history data in which the vibration measurement data from the sensor is accumulated). Specifically, the processing target determination unit 191 cuts out a portion of the time-series data of the vibration measurement value in a time period satisfying a predetermined trigger condition as a trigger. The processing target determination unit 191 collects triggers generated from the same event into one trigger.

The trigger detection unit 192 determines a trigger from vibration data measured by the sensor at the single observation point. The trigger detection unit 192 may determine a trigger by using a plurality of determination methods (therefore, by using a plurality of determination criteria). In this case, the determination criterion will be referred to as a trigger type. That is, a trigger can be classified according to the criterion used for detecting the trigger. A group classified into will be referred to as a trigger type.

In the following description, a case where a trigger determination criterion is modeled and the trigger detection unit 192 applies (inputs) vibration measurement data to a model to determine a trigger will be described as an example. This model will be referred to as a trigger model. However, the format of the trigger model is not limited to a specific format. For example, the trigger model may be formed of a neural network. Alternatively, the trigger model may be described by mathematical formulae.

The trigger model may be a trained model by machine learning, or may be a model generated by a method other than machine learning, such as a model generated manually.

The trigger detection unit 192 determines each of the following normal trigger, different cycle trigger, and far-field trigger, for example.

Normal trigger: the normal trigger is a trigger that indicates shaking due to a normal earthquake. The trigger detection unit 192 inputs measurement data from a sensor that is a normal seismograph to a trigger model for the normal trigger and determines the normal trigger. Here, the term "normal seismograph" is used to distinguish it from a broadband meter. The normal seismograph is highly sensitive to relatively high frequency vibrations, and the broadband meter is highly sensitive to relatively low frequency vibrations.

The normal trigger has a cycle and waveform attenuation that are common in near-field/tectonic earthquakes. The normal trigger can be detected by the trigger model for the normal trigger detecting these features such as the cycle and waveform attenuation.

Different cycle trigger (low frequency trigger): The different cycle trigger is a trigger that indicates shaking due to a low frequency earthquake. The trigger detection unit 192 inputs the measurement data from a sensor that is a broadband meter to a trigger model for the different cycle trigger to determine the different cycle trigger.

Far-field trigger: The far-field trigger is a trigger that indicates shaking due to a far-field earthquake. A frequency is the same as that of the different cycle trigger, but a waveform is different from that of the different cycle trigger. Therefore, the trigger detection unit 192 inputs measurement data from a sensor that is a broadband meter to a trigger model for the far-field trigger to determine the far-field trigger.

The trigger detection unit 192 may input the measurement data from the sensor to the trigger model for each trigger type and acquire a trigger determination result for each trigger type as an output from the trigger model.

In a case where a trigger is determined in real time, the trigger model may output a signal indicating the presence or absence of occurrence of a trigger, such as outputting "1" when detecting the occurrence of the trigger and outputting "0" when not detecting the occurrence of the trigger.

Alternatively, in a case where there is a time lag between acquisition of the measurement data from the sensor and determination of the trigger, the trigger model may output a time period in which the occurrence of the trigger is detected.

In any case, the output of the trigger model indicates a time period in which the trigger is occurring. In this respect, the processing by the trigger detection unit 192 corresponds to temporarily determining data in the time period in which the trigger is occurring in the time-series data of the vibration as data that is a processing target. The temporary determination is performed because triggers are integrated by the trigger integration unit 194 as will be described later.

The trigger detection unit 192 may determine a trigger by using raw data (particularly, the data in a time domain) of the measurement data from the sensor. Alternatively, the trigger detection unit 192 may determine a trigger by using running spectrum data of the measurement data from the sensor. The running spectrum data referred to here is time-series data of data in a frequency domain obtained by providing a window for the most recent predetermined time with respect to the measurement data from the sensor and repeating Fourier transform of the data in the window, for example, at regular time intervals.

In the running spectrum analysis of the data from the broadband meter, a window size may be determined according to a frequency of a signal that is an analysis target, for example, the window size may be larger than that in a case of the running spectrum analysis of the data from the normal seismograph.

The exclusion trigger determination unit 193 determines a trigger caused by an event other than a natural earthquake (naturally occurring earthquake), such as an artificial sea earthquake and an artificial underground earthquake. Triggers caused by events other than these natural earthquakes will be referred to as exclusion triggers. Exclusion here indicates that a trigger is excluded from being an observation target of a natural earthquake such as estimation of the hypocenter of a natural earthquake.

The artificial sea earthquake occurs, for example, by firing an air gun in order to perform underground surveying on the seabed. In this case, air is released on the seabed, and thus only downward acceleration (push) is generated on the ground surface (seabed surface). In this respect, the artificial sea earthquake is different from a fault earthquake in which downward acceleration (push) and upward acceleration (pull) start to occur at the same time. In the artificial sea earthquake, an S wave does not propagate because an air gun is fired in seawater. The exclusion trigger determination unit 193 determines a trigger caused by the artificial sea earthquake on the basis of these features of the artificial sea earthquake.

The artificial underground earthquake occurs, for example, during construction or underground drilling. The exclusion trigger determination unit 193 also determines a trigger for the artificial underground earthquake on the basis of features of waveforms thereof.

A trigger determined by the exclusion trigger determination unit 193 corresponds to noise in relation to a trigger caused by a natural earthquake. As will be described later, when the type determination unit 195 determines an event type, noise can be removed by causing an event type other than the natural earthquake to be included as an event type. Specifically, in a case of observing a natural earthquake, a trigger of which a cause of vibration is classified as an event type other than a natural earthquake can be excluded from being a processing target, and thus this trigger can be removed as noise.

The trigger determined by the exclusion trigger determination unit 193 can be used for purposes other than detection of natural earthquakes, for example, in a case of investigating artificial vibrations as part of pollution investigation.

The trigger determination by the exclusion trigger determination unit 193 and the trigger determination by the trigger detection unit 192 are the same except that determination conditions are different. Therefore, in the same manner as in the case of the trigger determination by the trigger detection unit 192, the exclusion trigger determination unit 193 may determine a trigger by applying the vibration measurement data from the sensor to a trigger model. A trigger model in this case is not limited to a model of a specific type in the same manner as in the case of the trigger detection unit 192. The trigger model in this case may be a trained model or a model generated according to a method other than machine learning in the same manner as in the case of the trigger detection unit 192.

The exclusion trigger determination unit 193 may further remove a trigger causing noise on the basis of weather information such as measurement data from a weather sensor. For example, as described above for the seismic observation device 100, the exclusion trigger determination unit 193 may refer to a sensor measurement value of wind power, and exclude a water pressure gauge on the seabed at that location from earthquake detection in a case where the wind power is strong. Consequently, it is possible to reduce the possibility of erroneously detecting a change in water pressure due to the influence of wind as a vibration due to an earthquake.

The exclusion trigger determination unit 193 corresponds to an example of an exclusion processing unit.

The trigger integration unit 194 integrates triggers at a plurality of phases caused by the same event among a plurality of triggers detected at the same observation point.

For example, in a case of a far-field earthquake, when a P wave or an S wave propagates in the ground and shakes the ground surface, a P wave and an S wave may be further derived.

FIG. 3 is a diagram illustrating an example of a succeeding wave in a seismic wave. A horizontal axis of the graph in FIG. 3 represents time. A vertical axis represents an amplitude. In FIG. 3, a scale of 10 minutes is illustrated as a guideline for a length of time.

In the seismic wave graph of FIG. 3, a P wave and a PP wave that is a P wave derived from this P wave are illustrated. In this graph, an S wave, an SS wave that is an S wave derived from this S wave, and an SSS wave that is an S wave further derived from this SS wave are illustrated. This graph illustrates a surface wave propagating on the ground surface.

For example, in the estimation of the hypocenter, it is appropriate that such succeeding waves (the derived PP wave, SS wave, and SSS wave) are assumed to be derived from the same seismic waves as the preceding seismic waves (the original P wave and S wave) and are integrated into the preceding seismic waves, and the hypocenter is predicted on the basis of the preceding seismic waves. In particular, by performing machine learning of the trigger determination by the trigger detection unit 192, a succeeding wave that is buried in noise and is not detected by the conventional manual seismic wave detection may be detected.

Therefore, the trigger integration unit 194 integrates the succeeding waves into the preceding seismic waves. In terms of the seismic wave detection start time, the trigger integration unit 194 leaves information regarding the detection start time of the preceding seismic wave and deletes information regarding the detection start time of the succeeding wave. Consequently, for example, it is possible to avoid an error of applying information regarding a succeeding wave when estimating the hypocenter.

In the case of the example in FIG. 3, the trigger integration unit 194 integrates the PP wave into the P wave and integrates the SS wave and the SSS wave into the S wave. In terms of the seismic wave detection start time, the trigger integration unit 194 leaves the P wave detection start time and the S wave detection start time, and deletes the PP wave detection start time, the SS wave detection start time, and the SSS wave detection start time.

The trigger integration unit 194 may statistically determine a trigger caused by the same event. For example, the trigger integration unit 194 determines whether or not a plurality of observed triggers are caused by the same event on the basis of statistical data of the position (an arrival time point at the observation point), the shape, and the level (amplitude magnitude) of each of the P wave and the S wave.

The trigger integration unit 194 may determine triggers caused by the same event through machine learning. The trigger integration unit 194 performs supervised learning by using, as, for example, vibration measurement data with a sufficient length including a P wave and an S wave and input data to a model, training data having a manual determination result of a trigger caused by the same event such as a P wave and an S wave as a correct answer. The trigger integration unit 194 may use an obtained trained model to determine and integrate triggers caused by the same event.

As will be described later, the seismic observation device 100 may perform machine learning. Alternatively, a device other than the seismic observation device 100 may perform machine learning, and the seismic observation device 100 may acquire a trained model obtained through the machine learning.

The trigger integration unit 194 performs SP conversion. The SP conversion is conversion for correctly correcting a distinction between an S wave and a P wave. For example, in a case where the P wave is buried in noise and cannot be detected, the S wave may be erroneously determined as the P wave. In this case, in the SP conversion, a determination of the S wave is converted into a determination of the P wave.

The trigger integration unit 194 may perform SP conversion by determining each of a P wave and an S wave in a process of integrating triggers caused by the same event described above.

The type determination unit 195 classifies triggers according to an event type. Specifically, the type determination unit 195 calculates the likelihood of a trigger event (cause of vibration) belonging to each preset event type. The type determination unit 195 classifies triggers, and thus a classification result from the type determination unit 195 can be used in a case where a plurality of triggers are grouped for each trigger derived from the same earthquake in the subsequent process.

FIG. 4 is a diagram illustrating an example of a distribution of triggers. FIG. 4 illustrates an example in a case where two earthquakes occur at approximately the same time, and the types of trigger events are illustrated for each observation point. The triggers are grouped according to the classification of the triggers by the type determination unit 195, and thus the triggers are grouped into triggers derived from an earthquake 1 and triggers derived from an earthquake 2.

FIG. 5 is a diagram illustrating an example of the likelihood for each type of event. In the example of FIG. 5, a "near-field earthquake", a "far-field earthquake", a "low frequency earthquake", an "artificial earthquake", a "micro-earthquake", and a "volcanic earthquake" are predefined as event types. The type determination unit 195 calculates the likelihood (the likelihood of the event of the trigger being classified as that type) for each of the three triggers of trigger A, trigger B, and trigger C for each predetermined event type. FIG. 5 illustrates the highest likelihood circled for each trigger.

However, an event type is not limited to a specific one. For example, instead of the "artificial earthquake" in the example of FIG. 5, an "artificial sea earthquake" and an "artificial underground earthquake" may be set.

In a case where the triggers are grouped as illustrated in the example in FIG. 4 on the basis of the likelihood calculated by the type determination unit 195, the triggers may be grouped by taking a correlation of a likelihood vector by using the likelihood calculated by the type determination unit 195 for each type as a likelihood vector for each trigger.

Alternatively, the likelihood may be grouped on the basis of the magnitude of the likelihood calculated by the type determination unit 195. For example, each trigger may be classified as a group with the highest likelihood. In this case, by using the likelihood corrected by the determination integration processing unit 196 that will be described later, grouping can be performed with higher accuracy than in a case where the likelihood calculated by the type determination unit 195 is used without being corrected.

The process performed by the type determination unit 195 may be regarded as a classification based on the condition determination in the same manner as the process performed by the trigger detection unit 192. The determination criterion used by the type determination unit 195 may be modeled in the same manner as the determination criterion used by the trigger detection unit 192. A model indicating the determination criterion used by the type determination unit 195 will be referred to as an event model. The event model is not limited to a specific type of model in the same manner as in the case of the trigger model. The event model may be a trained model or a model generated according to a method other than machine learning in the same manner as in the case of the trigger model.

The type determination unit 195 classifies triggers for each event type, and thus it is possible to roughly classify triggers at a plurality of observation points as a preprocess for classifying the triggers for each earthquake. Consequently, when classifying the triggers at the plurality of observation points for each earthquake, it can be expected that an earthquake will be able to be accurately determined without mixing extra triggers.

The determination integration processing unit 196 corrects the likelihood calculated by the type determination unit 195.

As one of methods of classifying a trigger as any event type on the basis of the likelihood calculated by the type determination unit 195, a method of classifying the trigger as a group with the highest likelihood may be considered. On the other hand, in classification of seismic waves, due to the mechanism of seismic wave generation, a seismic waveform may show features close to those of cause of vibrations other than an actual cause of vibration.

From this, the likelihoods of a plurality of groups (a plurality of event types) may be calculated to be high due to calculation of the likelihood by the type determination unit 195. The likelihoods of other types may be calculated to be higher than the likelihood of the actual event type.

For example, since the features of the seismic waveform of the volcanic earthquake and the features of the seismic waveform of the low frequency micro-earthquake are similar, in the case of the volcanic earthquake, the type determination unit 195 may calculate not only the likelihood of the volcanic earthquake but also the likelihood of low frequency earthquake to be high.

In this case, even if the likelihood of the low frequency earthquake is calculated to be higher than the likelihood of the volcanic earthquake, it is preferable to select the likelihood of the volcanic earthquake that is an actual event.

In the case of the example in FIG. 5, in the trigger C, the actual event is the volcanic earthquake but the likelihood of the low frequency earthquake is the highest at "0.92".

On the other hand, the seismic waveform of the volcanic earthquake and the seismic waveform of the low frequency micro-earthquake have different features of frequency components and can thus be distinguished. Therefore, in the case of the low frequency earthquake, the type determination unit 195 calculates the likelihood of the low frequency earthquake to be high, but calculates the likelihood of the volcanic earthquake to be relatively low.

Therefore, the determination integration processing unit 196 corrects the likelihood so as to increase the likelihood of the actual event type.

FIG. 6 is a diagram illustrating examples of coefficients used for the determination integration processing unit 196 to correct a likelihood. In FIG. 6, coefficient vectors used for the determination integration processing unit 196 to correct a likelihood are illustrated in a table form, an event illustrated on the left side of the table indicates an input, and an event illustrated on the upper side indicates an output.

Therefore, a likelihood calculated by the type determination unit 195 is input for each event illustrated on the left side. The table is traced in the row direction, and in a column where the coefficient is stored, the coefficient is multiplied by the likelihood. The blank column indicates "0".

Next, the table is traced vertically (column direction), and values in the respective columns (values obtained by multiplying likelihoods by coefficients) are totaled to calculate a corrected likelihood.

In a case where the coefficient in FIG. 6 is applied to the likelihood of the trigger C in FIG. 5, the likelihood of the low frequency earthquake before correction is "0.92", and the likelihood of the volcanic earthquake before correction is "0.91".

The likelihood of the low frequency earthquake after correction is calculates as follows:

$$1 \times 0.92 - 0.5 \times 0.91 = 0.465$$

On the other hand, the likelihood of the volcanic earthquake after correction is calculated as follows:

$$0.7 \times 0.92 + 1 \times 0.91 = 1.544$$

Before the correction, the likelihood of the low frequency earthquake is the highest, but after the correction, the likelihood of the volcanic earthquake that is the actual event type is the highest.

The process performed by the determination integration processing unit 196 may also be a target of machine learning. Alternatively, for the process performed by the determination integration processing unit 196, the process may be constructed by a method other than the machine learning, instead of manually generating a processing model.

In a case where the process performed by the determination integration processing unit 196 is a target of machine learning, the process performed by the determination integration processing unit 196 is represented by a matrix, and can thus be executed by a fully connected single-layer neural network. A weight value of this neural network may be determined through the machine learning.

Next, the process of the seismic observation device 100 will be described with reference to FIG. 7.

Figure 7:
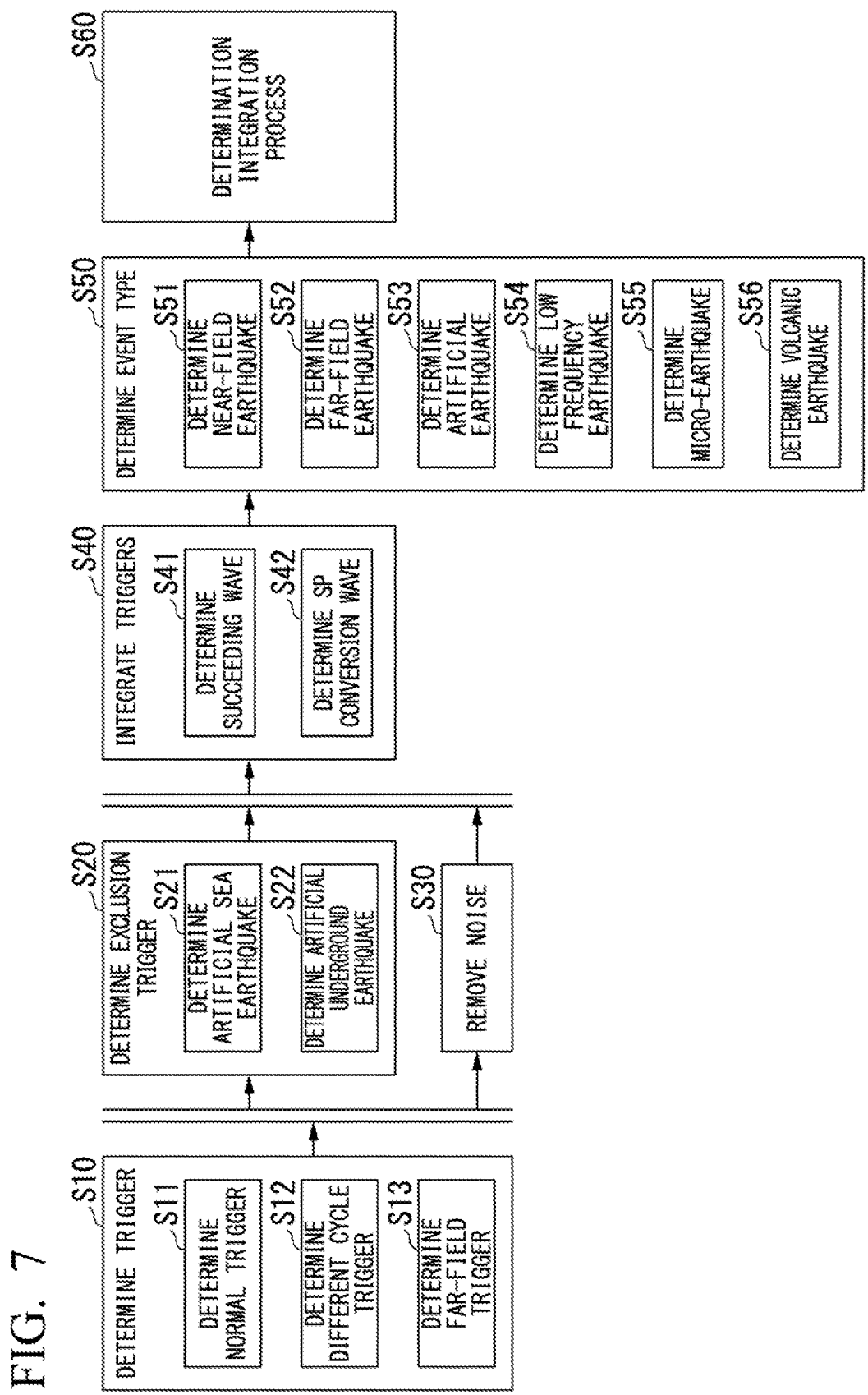
FIG. 7 is a diagram illustrating an example of a procedure of a process performed by the seismic observation device according to the embodiment.

As illustrated in FIG. 7, the seismic observation device 100 performs the process in the following procedure from step S10 to step S60.

(Step S10)

The trigger detection unit 192 determines a trigger. Specifically, the trigger detection unit 192 determines the determination of the normal trigger (step S11), the determination of the different cycle trigger (step S12), and the determination of the far-field trigger (step S13).

After step S10, the process transitions to steps S20 and S30. The seismic observation device 100 may processes in steps S20 and S30 in parallel. Alternatively, the process in step S20 and the process in step S30 may be sequentially executed, for example, the seismic observation device 100 executes the process in step S20 and then executes the process in S30.

(Step S20)

The exclusion trigger determination unit 193 determines an exclusion trigger. Specifically, the exclusion trigger determination unit 193 performs determination of an artificial sea earthquake (step S21) and determination of an artificial underground earthquake (step S22).

(Step S30)

The exclusion trigger determination unit 193 removes noise. For example, the exclusion trigger determination unit 193 refers to sensor measurement value of wind power, and in a case where the wind power is strong, excludes the water pressure gauge on the seabed at that location from detection of an earthquake.

When both the process in step S20 and the process in step S30 are finished, the process proceeds to step S40.

(Step S40)

The trigger integration unit 194 integrates triggers. Specifically, the trigger integration unit 194 integrates triggers at a plurality of phases caused by the same event among a plurality of triggers detected at the same observation point (step S41). The trigger integration unit 194 corrects determinations of a P wave and an S wave for a trigger in which the P wave and the S wave are erroneously determined (step S42).

After step S40, the process proceeds to step S50.

(Step S50)

The type determination unit 195 determines the type of trigger event.

Specifically, the type determination unit 195 calculates a likelihood of the trigger event being a near-field earthquake (step S51). The type determination unit 195 calculates a likelihood of the trigger event being a far-field earthquake (step S52). The type determination unit 195 calculates a likelihood of the trigger event being an artificial earthquake (step S53). The type determination unit 195 calculates a likelihood of the trigger event being a low frequency earthquake (step S54). The type determination unit 195 calculates a likelihood of the trigger event being a micro-earthquake (step S55). The type determination unit 195 calculates a likelihood of the trigger event being a volcanic earthquake (step S56).

After step S50, the process proceeds to step S60.

(Step S60)

The determination integration processing unit 196 corrects the likelihood calculated by the type determination unit 195.

After step S60, the seismic observation device 100 finishes the process in FIG. 7.

In a case where the process in each unit of the control unit 190 is generated through machine learning, the seismic observation device 100 may execute the machine learning, or a device other than the seismic observation device 100 may perform the machine learning. Hereinafter, a case where a model generation device 300 different from the seismic observation device 100 executes machine learning will be described with reference to FIG. 8.

Figure 8:
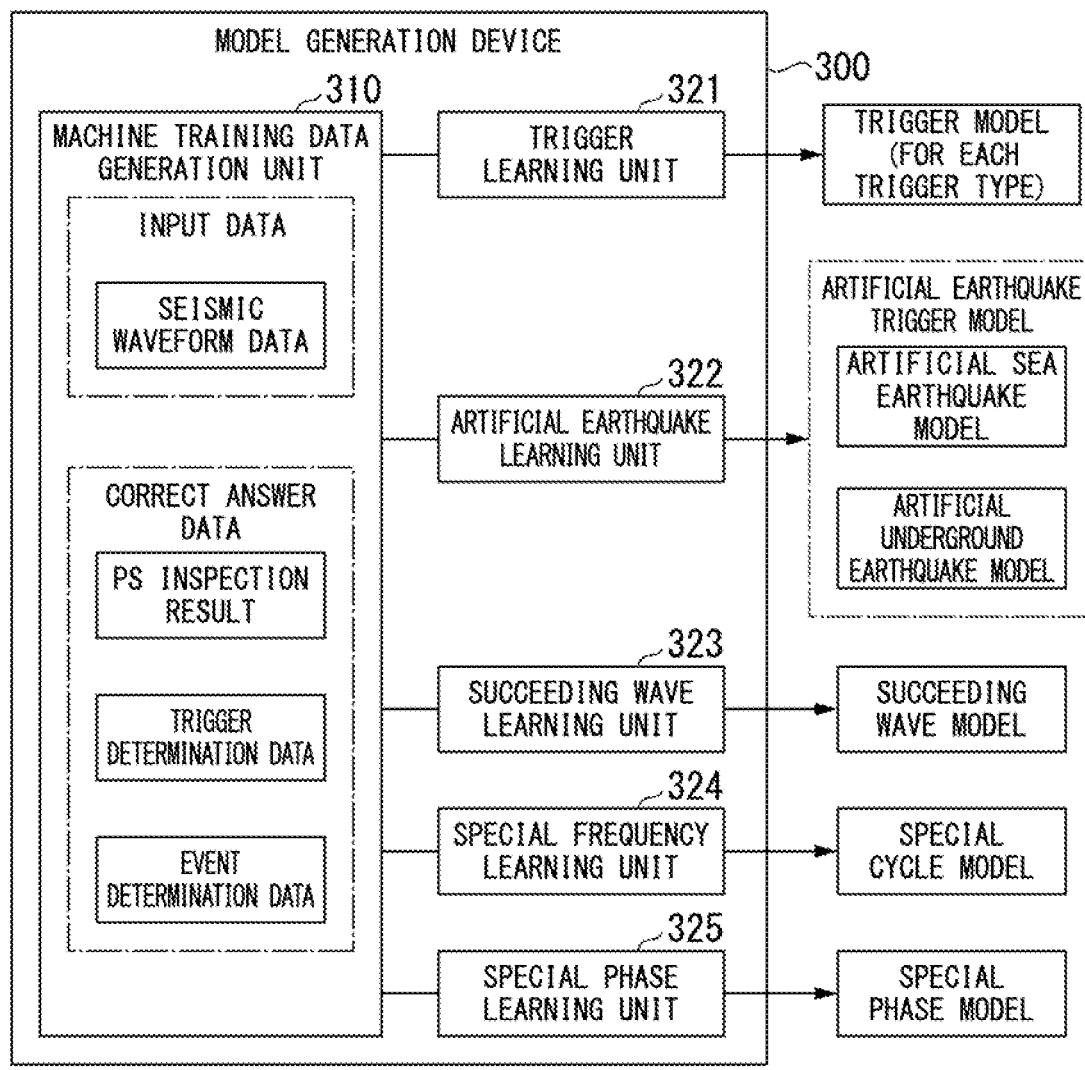
FIG. 8 is a block diagram illustrating an example of a functional configuration of a model generation device according to the embodiment.

FIG. 8 is a schematic block diagram illustrating an example of a functional configuration of the model generation device according to the embodiment.

With the configuration illustrated in FIG. 8, the model generation device 300 includes a machine training data generation unit 310, a trigger learning unit 321, an artificial earthquake learning unit 322, a succeeding wave learning unit 323, a special frequency learning unit 324, and a special phase learning unit 325.

The model generation device 300 executes machine learning to generate a model used for the process in each unit of the control unit 190.

The model generation device 300 is configured by using a computer such as a workstation or a mainframe.

The machine training data generation unit 310 generates supervised machine training data. Specifically, the machine training data generation unit 310 acquires seismic waveform data as input data to a model. The seismic waveform data may be vibration data measured by a sensor, or may be data generated through, for example, simulation, separately from actual measurement data.

The machine training data generation unit 310 acquires PS inspection results, trigger determination data, and event determination data as correct answer data. The PS inspection results are data obtained by manually inspecting a P wave and an S wave in the seismic waveform data for each piece of the seismic waveform data. The trigger determination data is data indicating a result of manually determining a trigger in the seismic waveform data for each piece of the seismic waveform data. The event determination data is data indicating a result of manually determining a vibration event indicated by the seismic waveform data for each piece of the seismic waveform data.

The machine training data generation unit 310 generates training data that is combined with either the input data or the correct answer data for each learning unit (that is, the trigger learning unit 321, the artificial earthquake learning unit 322, the succeeding wave learning unit 323, the special frequency learning unit 324, and the special phase learning unit 325).

The trigger learning unit 321 performs machine learning using a trigger model. Specifically, the trigger learning unit 321 performs machine learning to determine a model parameter value (learning parameter value) by using a trigger model (for example, a normal trigger model, a different cycle trigger model, a far-field trigger model) prepared for each type of trigger such as a normal trigger, a different cycle trigger, and a far-field trigger.

The trigger learning unit 321 performs supervised learning by using vibration measurement data in a time period including a time for which it is determined that a trigger has occurred and a time before and after the time as input data to the model, and training data in which either a manual trigger flag or a trigger flag by another system is judged to be correct by a person as correct answer data. The trigger flag referred to here is data indicating a trigger determination result (a determination result of the presence or absence of trigger occurrence). Specifically, the trigger flag is data indicating the time for which it is determined that the trigger has occurred.

Through this machine learning, the trigger learning unit 321 sets a parameter value of the trigger model such that the trigger flag is output with the vibration measurement data as an input.

The artificial earthquake learning unit 322 performs machine learning by using an artificial earthquake trigger model to determine a model parameter value.

As the artificial earthquake trigger model, an artificial sea earthquake model and an artificial underground earthquake model may be prepared. In this case, the artificial earthquake learning unit 322 performs machine learning for each of the artificial sea earthquake trigger model and the artificial underground earthquake model, and determines a model parameter value.

Alternatively, as the artificial earthquake trigger model, an artificial earthquake model common to both an artificial sea earthquake and an artificial underground earthquake may be prepared. In this case, the artificial earthquake learning unit 322 performs machine learning by using this artificial earthquake trigger model to determine a model parameter value.

The artificial earthquake learning unit 322 uses a sample waveform of the artificial earthquake (vibration measurement data including vibration data of the artificial earthquake) as an input to the model, and performs supervised learning by using training data in which the manual trigger flag is a correct answer. Here, the trigger flag is data indicating a determination result of the trigger of the artificial earthquake (the determination result of the presence or absence of occurrence of the trigger due to the artificial earthquake).

In a case where it is necessary to distinguish between the artificial sea earthquake and the artificial underground earthquake, machine learning is performed separately for each earthquake.

Through this machine learning, the artificial earthquake learning unit 322 sets a parameter value of the model (the artificial sea earthquake model and the artificial underground earthquake model, or a model common to the artificial sea earthquake and the artificial underground earthquake) such that the trigger flag is output with the vibration measurement data as an input.

The succeeding wave learning unit 323 performs machine learning by using a succeeding wave model to determine a model parameter value. The succeeding wave model is a model that receives input of seismic waveform data and detects a succeeding wave in a seismic waveform indicated by the data.

The succeeding wave learning unit 323 uses vibration measurement data of a single earthquake (vibration measurement data when no simultaneous earthquakes occur) as an input to the model, and performs supervised learning by using training data in which a manual phase determination result is a correct answer. When no new phase is determined in the phase determination result given as the correct answer, this indicates that a seismic wave is a succeeding wave.

Through this machine learning, the succeeding wave learning unit 323 sets a parameter value of the succeeding wave model such that the phase determination result is output with the vibration measurement data as an input. When the seismic wave included in the vibration measurement data is not determined as a new phase, this indicates that the seismic wave is a succeeding wave.

The special frequency learning unit 324 performs machine learning by using a special cycle model to determine a model parameter value. Here, an earthquake having a cycle or duration different from that of a normal earthquake will be referred to as a special cycle earthquake. Therefore, the special cycle earthquake is a general term for an earthquake with a longer cycle than that of a normal earthquake, an earthquake with shorter cycle than that of a normal earthquake, an earthquake with longer duration than that of a normal earthquake, and an earthquake with shorter duration than that of a normal earthquake.

The special frequency learning unit 324 may further perform machine learning for earthquakes different from a normal earthquake in addition thereto.

The special frequency learning unit 324 performs supervised learning by using training data in which vibration measurement data including vibration data of the special cycle earthquake is an input and a manual trigger flag is a correct answer. Here, the trigger flag is data indicating a determination result of a trigger of the special cycle earthquake (the determination result of the presence or absence of occurrence of the trigger due to the special cycle earthquake).

Through this machine learning, the special frequency learning unit 324 sets a parameter value of the special cycle model such that the trigger flag is output with the vibration measurement data as an input.

A trigger is determined by using the special cycle model, and thus a possibility of overlooking the occurrence of the trigger can be reduced. A trigger is determined by using the special cycle model, and thus it is possible to detect the special cycle earthquake and collect the data, and the obtained data can be used for the research of the special cycle earthquake.

The special phase learning unit 325 performs machine learning by using a special phase model to determine a model parameter value. In the special phase model, the special phase referred to here is a phase other than the P phase and the S phase. The special phase model receives input of seismic waveform data and detects seismic waves with phases other than the P phase and the S phase illustrated in the data.

The special phase learning unit 325 performs supervised learning by using the training data in which vibration measurement data including a waveform with the special phase is an input and a manual detection result of the special phase is a correct answer.

Through this machine learning, the special phase learning unit 325 sets a parameter value of the special phase model such that a detection result of the special phase is output with the vibration measurement data as an input.

The special phase model is used to determine a trigger. A trigger is determined by using the special phase model, and thus it is possible to reduce a possibility of overlooking the occurrence of the trigger and a possibility of erroneously detecting the type of the trigger. A waveform with the special phase is detected by using the special phase model, and thus data of the special phase can be collected, and the obtained data can be used for the research of the special phase.

Next, an experimental example of seismic wave detection based on machine learning will be described with reference to FIGS. 9 and 10. In the experiment, vibration measurement data is input to a neural network that has been machine-learned offline to determine the P wave arrival time and the S wave arrival time.

Figure 9:
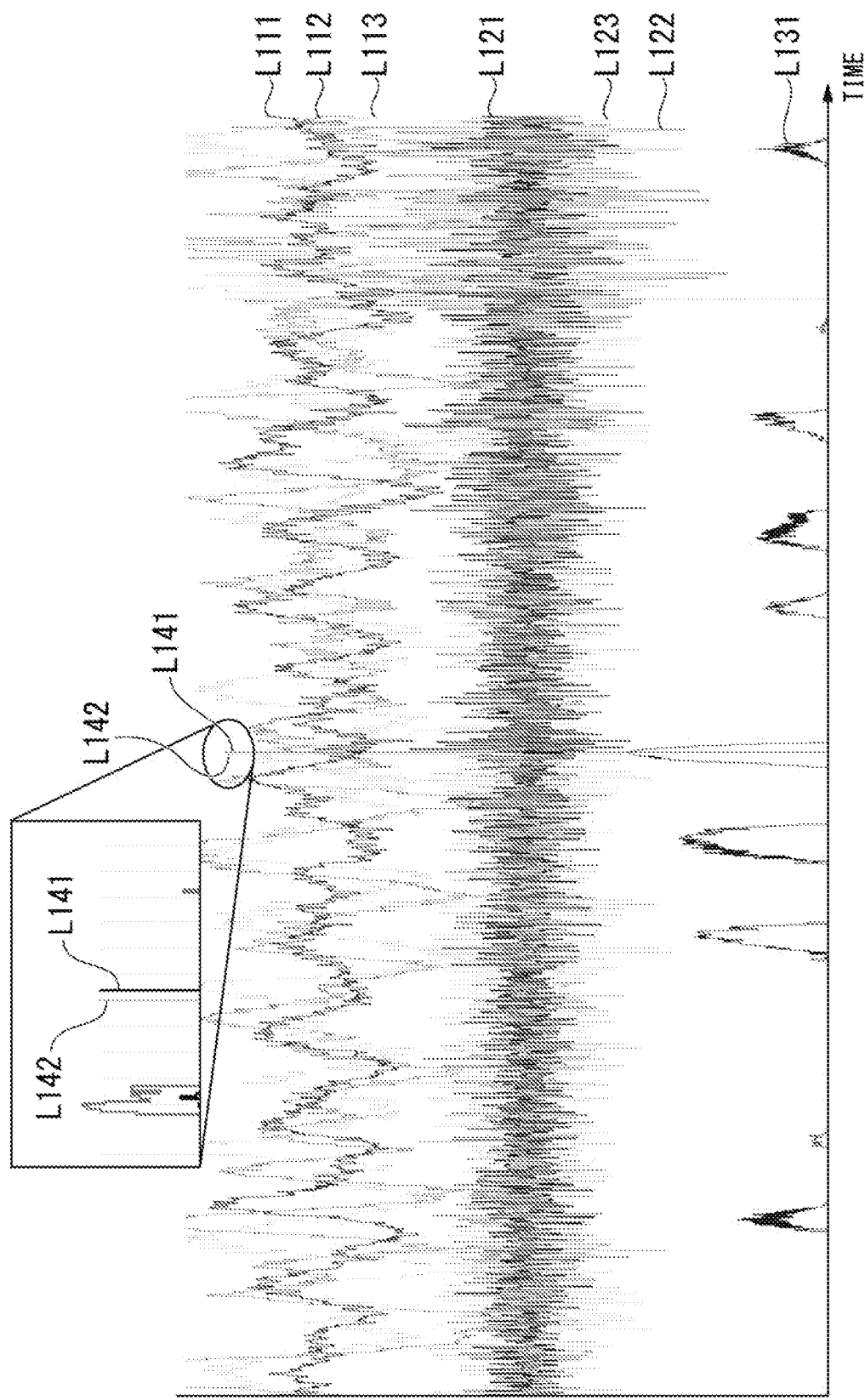
FIG. 9 is a graph illustrating a first example of seismic wave detection in the embodiment.

FIG. 9 is a diagram illustrating a first example of seismic wave detection. FIG. 9 illustrates a first experiment result in which the P wave is detected by using the machine learning result. The horizontal axis of the graph in FIG. 9 represents time. The vertical axis represents a data value such as an amplitude.

A line L111 indicates an amplitude of vertical movement. Both of lines L112 and L113 indicate amplitudes of horizontal movement.

Lines L121, L122, and L123 respectively indicate waveforms obtained by applying a bandpass filter to vibration waveforms of the lines L111, L112, and L113.

A line L131 indicates the likelihood of a P wave calculated by using a learning model obtained through machine learning (the likelihood of the time being the arrival time of the P wave).

A line L141 indicates a time point at which the likelihood of the P wave is highest. A line L142 indicates a result of manual P wave inspection.

The line L141 and line L142 indicate almost the same timing, and it can be said that the P wave can be detected with high accuracy through the machine learning.

Figure 10:
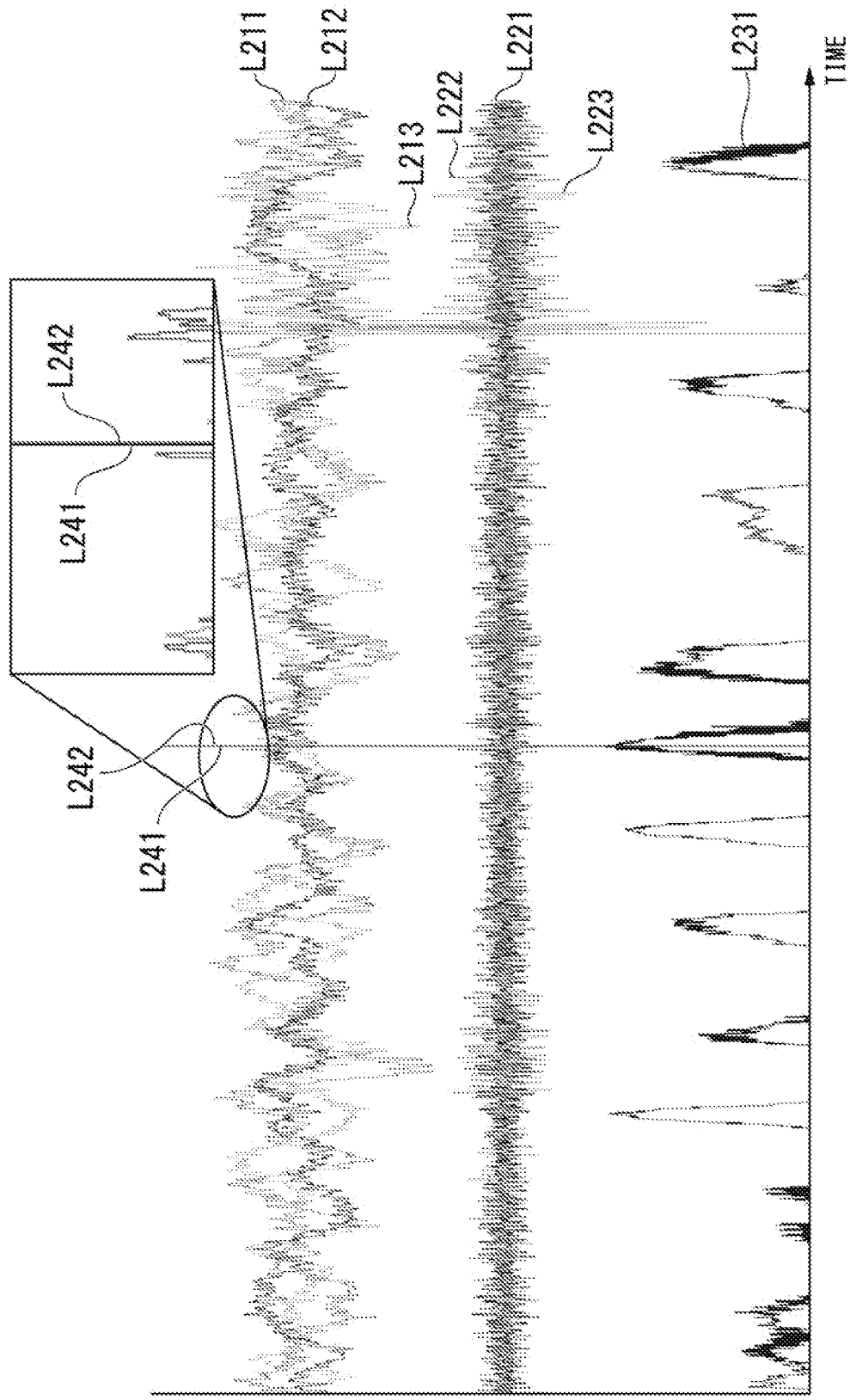
FIG. 10 is a graph illustrating a second example of seismic wave detection in the embodiment.

FIG. 10 is a diagram illustrating a second example of seismic wave detection. FIG. 10 illustrates a second experiment result in which the P wave is detected by using the machine learning result. A horizontal axis of the graph in FIG. 10 represents time. A vertical axis represents a data value such as an amplitude.

A line L211 indicates an amplitude of vertical movement. Both of lines L212 and L213 indicate amplitudes of horizontal movement.

Lines L221, L222, and L223 respectively indicate waveforms obtained by applying a bandpass filter to vibration waveforms of the lines L211, L212, and L213, respectively.

A line L231 indicates the likelihood of the P wave calculated by using a learning model obtained through machine learning (the likelihood of the time being the arrival time of the P wave).

A line L241 indicates a time point at which the likelihood of the P wave is highest. A line L242 indicates a result of manual P wave inspection.

The line L241 and line L242 indicate almost the same timing, and it can be said that the P wave can be detected with high accuracy through the machine learning.

As in the examples in FIGS. 9 and 10, it is possible to determine the P wave arrival time and the S wave arrival time through machine learning in the same manner as in the case of manual operation. In particular, even in a case where it is difficult for the human eye to determine where it is and it is necessary to perform a preprocess such as applying a bandpass filter, the determination can be performed in the machine learning without the need for such preprocess.

As described above, the communication unit 110 receives the input of the time-series data of the vibration measurement value. The processing target determination unit 191 determines a time period that is a processing target in the time-series data acquired by the communication unit 110. The type determination unit 195 acquires a likelihood of a cause of vibration indicated in the time-series data in the time period that is a processing target being classified into types for each type of cause of vibration.

According to the seismic observation device 100, it is possible to perform more flexible classification without limitation to distinguish between an earthquake and a daily vibration. For example, it is possible to distinguish between a seismic wave of a far-field earthquake and a seismic wave of a near-field earthquake by referring to the likelihood of the far-field earthquake and the likelihood of the near-field earthquake calculated by the type determination unit 195.

The type determination unit 195 applies time-series data in a time period that is a processing target to a trained model provided for each type of cause of vibration, and thus acquires a likelihood for each type of cause of vibration (event).

According to the seismic observation device 100, by determining an event type by using the trained model, it is possible to determine an event type with high accuracy without having to manually set features for each event.

The type determination unit 195 acquires the likelihoods of causes of vibrations other than natural earthquakes in addition to the likelihoods of causes of vibrations classified as natural earthquakes.

In a case where a processing result of the seismic observation device 100 is used for observing a natural earthquake, it is possible to remove a trigger caused by an event other than the natural earthquake as noise by excluding the trigger classified as an event other than the natural earthquake from a processing target.

The processing result of the seismic observation device 100 can be used for observing vibrations caused by events other than natural earthquakes, such as artificial earthquakes.

The communication unit 110 receives the input of the time-series data including time-series data of water pressure.

The type determination unit 195 calculates a likelihood on the basis of the time-series data of water pressure.

The seismic observation device 100 can observe vibrations by using not only ground observation points but also underwater observation points.

In the seismic observation device 100, it is possible to distinguish between the P wave and the S wave by utilizing the property that the P wave propagates but the S wave does not propagate in water.

The exclusion trigger determination unit 193 excludes noise data from being a processing target in the time-series data in a time period that is the processing target on the basis of weather data.

According to the seismic observation device 100, noise data (for example, a trigger that causes noise) can be excluded, and thus a vibration can be observed with high accuracy.

By automating the processes performed by the seismic observation device 100, the following effects can be achieved.

In a case where the occurrence of an earthquake is detected by an analytical solution and a seismic wave is analyzed manually, there are many insensitive earthquakes that occur every day, and thus there is a possibility that the manual analysis cannot catch up. On the other hand, when the seismic observation device 100 automatically performs the processes, a burden on a person can be reduced and the processes can be avoided from being delayed.

In a case where a seismic wave is manually analyzed, variations occur due to individual differences in skills.

In a case where a seismic wave is manually analyzed, it may not be possible to detect earthquakes depending on difficult waves. On the other hand, when the seismic observation device 100 automatically performs the processes, it is possible to eliminate variations due to individual differences in skills. Since the seismic observation device 100 detects a seismic wave through a process different from that in a case of visual inspection, there is a possibility that the seismic wave that cannot be detected manually can be detected.

In the case of manual seismic wave analysis, a method is used in which a difference in amplitude is observed and a time point at which an earthquake arrived is detected to determine a phase. With this method, if noise is large, it is difficult to find an earthquake even if there is a change in the earthquake. On the other hand, in the seismic observation device 100, for example, by detecting a vibration by using a frequency having relatively low noise, a vibration such as a seismic wave can be detected even in a case where the noise is relatively large.

The seismic observation device 100 analyzes a vibration by using a machine learning result, and thus analysis can be performed by using features that cannot be set manually. In this respect, the seismic observation device 100 can analyze a vibration with higher accuracy.

For example, according to the seismic observation device 100, there is a possibility that a micro-earthquake that can be detected manually because it is hidden by noise can be detected.

Next, a configuration according to the embodiment will be described with reference to FIGS. 11 and 12.

Figure 11:
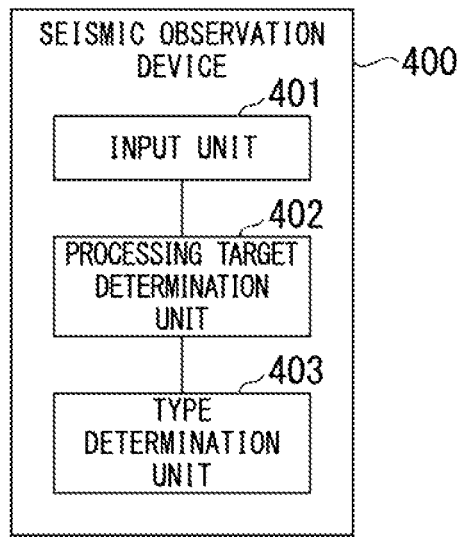
FIG. 11 is a block diagram illustrating a seismic observation device according to an embodiment of the minimum configuration of the present invention.

FIG. 11 is a diagram illustrating a configuration of a seismic observation device according to an embodiment of the minimum configuration. A seismic observation device 400 illustrated in FIG. 11 includes an input unit 401, a processing target determination unit 402, and a type determination unit 403.

With such a configuration, the input unit 401 receives the input of time-series data of vibration measurement values. The processing target determination unit 402 determines a time period that is a processing target in the time-series data. The type determination unit 403 acquires a likelihood of a cause of vibration indicated in the time-series data in the time period that is a processing target being classified into types for each type of cause of vibration.

According to the seismic observation device 400, it is possible to perform more flexible classification regardless of whether a generated vibration is an earthquake or a daily vibration. For example, the type determination unit 403 calculates the likelihood of a far-field earthquake and the likelihood of a near-field earthquake, and can thus distinguish between a seismic wave of the far-field earthquake and a seismic wave of the near-field earthquake by referring to these likelihoods. Alternatively, the seismic observation device 400 can select an appropriate event from among event candidates.

Figure 12:
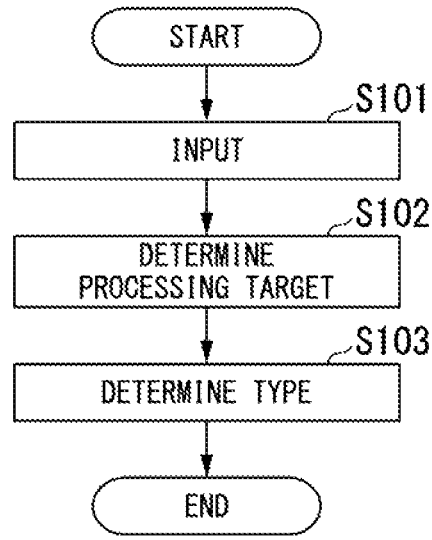
FIG. 12 is a flowchart illustrating a processing procedure of a seismic observation method according to the embodiment of the minimum configuration of the present invention.

FIG. 12 is a diagram illustrating a processing procedure in a seismic observation method according to an embodiment of the minimum configuration.

A process in FIG. 12 includes an input step (step S101) of receiving input of time-series data of vibration measurement values, a processing target determination step (step S102) of determining a time period that is a processing target in the time-series data, and a type determination step (step S103) of acquiring a likelihood of a cause of vibration indicated in the time-series data in the time period that is a processing target being classified into types for each type of cause of vibration.

According to the process in FIG. 12, it is possible to perform more flexible classification regardless of whether a generated vibration is an earthquake or a daily vibration. For example, in step S103, by calculating the likelihood of a far-field earthquake and the likelihood of a near-field earthquake, it is possible to distinguish between a seismic wave of the far-field earthquake and a seismic wave of a near-field earthquake by referring to these likelihoods.

Figure 13:
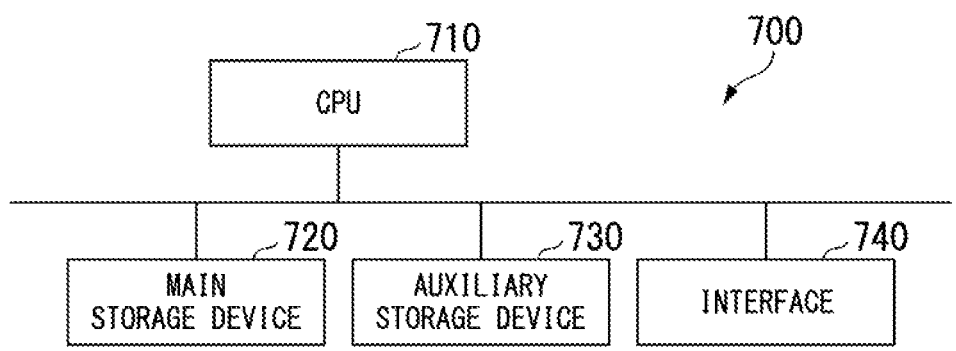
FIG. 13 is a block diagram illustrating a configuration of a computer according to at least one of the above embodiments.

FIG. 13 is a schematic block diagram illustrating a configuration of a computer according to at least one of the above-described embodiments.

In the configuration illustrated in FIG. 13, a computer 700 includes a central processing unit (CPU) 710, a main storage device 720, an auxiliary storage device 730, and an interface 740.

Any one or more of the seismic observation device 100, the seismic processing device 230, the model generation device 300, and the seismic observation device 400 may be mounted on the computer 700. In that case, an operation of each of the above processing units is stored in the auxiliary storage device 730 in the form of a program. The CPU 710 reads the program from the auxiliary storage device 730, loads the program to the main storage device 720, and executes the above process according to the program. The CPU 710 secures a storage area corresponding to each of the above storage units in the main storage device 720 according to the program.

In a case where the seismic observation device 100 is mounted on the computer 700, operations of the control unit 190 and each unit thereof are stored in the auxiliary storage device 730 in the form of a program. The CPU 710 reads the program from the auxiliary storage device 730, loads the program to the main storage device 720, and executes the processes of the control unit 190 and each unit thereof according to the program.

The CPU 710 secures storage areas corresponding to the storage unit 180 and each unit thereof in the main storage device 720 according to the program. The communication performed by the communication unit 110 is executed by the interface 740 having a communication function and performing communication under the control of the CPU 710.

In a case where the seismic processing device 230 is mounted on the computer 700, an operation of each of the single observation point trigger processing unit 232, the seismic determination unit 233, the phase inspection unit 234, the hypocenter estimation unit 235, and the notification processing unit 236 is stored in the auxiliary storage device 730 in the form of a program. The CPU 710 reads the program from the auxiliary storage device 730, loads the program to the main storage device 720, and executes the process in each of the units according to the program. The communication performed by the receiving unit 231 is executed by the interface 740 having a communication function and performing communication under the control of the CPU 710.

In a case where the model generation device 300 is mounted on the computer 700, an operation of each of the machine training data generation unit 310, the trigger learning unit 321, the artificial earthquake learning unit 322, the succeeding wave learning unit 323, the special frequency learning unit 324, and the special phase learning unit 325 is stored in the auxiliary storage device 730 in the form of a program. The CPU 710 reads the program from the auxiliary storage device 730, loads the program to the main storage device 720, and executes the process in each of the units according to the program.

In a case where the seismic observation device 400 is mounted on the computer 700, an operation of each of the processing target determination unit 402 and the type determination unit 403 are stored in the auxiliary storage device 730 in the form of a program. The CPU 710 reads the program from the auxiliary storage device 730, loads the program to the main storage device 720, and executes the process in each of the units according to the program.

The acquisition of data performed by the input unit 401 is executed by the interface 740 having a communication function and performing communication under the control of the CPU 710.

A program for executing all or some of the processes performed by the seismic observation device 100, the seismic processing device 230, the model generation device 300, and the seismic observation device 400 may be recorded on a computer-readable recording medium, and the process in each unit may be performed by reading the program recorded on the recording medium into a computer system and executing the program. The term "computer system" as used herein includes an OS or hardware such as peripheral devices.

The "computer-readable recording medium" refers to a portable medium such as a flexible disk, a magnetooptical disk, a ROM, or a CD-ROM, or a storage device such as a hard disk built into a computer system. The above program may be a program for realizing some of the above functions, and may be a program for realizing the above functions in combination with a program already recorded in the computer system.

Although the embodiments of the present invention have been described in detail with reference to the drawings, a specific configuration is not limited to these embodiments, and includes designs and the like within the scope without departing from the concept of the present invention.

INDUSTRIAL APPLICABILITY

The present invention can be used for a device for observing a generated vibration, and it is possible to perform more flexible distinguishing without limitation to distinguish whether a generated vibration is an earthquake or a daily vibration.

DESCRIPTION OF REFERENCE SYMBOLS

1 Seismic processing system
100, 400 Seismic observation device
110 Communication unit
180 Storage unit
181 Model storage unit
190 Control unit
191, 402 Processing target determination unit
192 Trigger detection unit
193 Exclusion trigger determination unit
194 Trigger integration unit
195, 403 Type determination unit
196 Determination integration processing unit
210 Sensor
220 Sensor data collecting device
230 Seismic processing device
231 Receiving unit
232 Single observation point trigger processing unit
233 Seismic determination unit
234 Phase inspection unit
235 Hypocenter estimation unit
236 Notification processing unit
240 Data server device
250 Tsunami processing device
261 Real-time display terminal device
262 Maintenance terminal device
263 Interactive processing terminal device
300 Model generation device
310 Machine training data generation unit
321 Trigger learning unit
322 Artificial earthquake learning unit
323 Succeeding wave learning unit
324 Special frequency learning unit
325 Special phase learning unit
401 Input unit

The invention claimed is:

1. A seismic observation device comprising:
a memory storing instructions; and
one or more processors connected to the memory and configured to execute the instructions to:
receive input of time-series data of measurement values of a vibration;
determine a time period of the time-series data that is a processing target; and
acquire a likelihood of classifying a cause of the vibration indicated in the time-series data in the time period, wherein the cause is classified as at least one of a near-field earthquake, a far-field earthquake, a low frequency earthquake, an artificial earthquake, a microearthquake, and a volcanic earthquake.

2. The seismic observation device according to claim 1, wherein the one or more processors are configured to further execute the instructions to acquire the likelihood for each type of cause by applying the time-series data in the time period to a trained model provided for each type of cause.

3. The seismic observation device according to claim 1, wherein the one or more processors are configured to further execute the instructions to acquire likelihoods of causes of vibrations other than a natural earthquake in addition to a likelihood of a cause of vibration classified as a natural earthquake.

4. The seismic observation device according to claim 1, wherein the one or more processors are configured to further execute the instructions to:
receive the input of the time-series data including time-series data of water pressure, and calculate the likelihood on the basis of the time-series data of the water pressure.

5. The seismic observation device according to claim 1, wherein the one or more processors are configured to further execute the instructions to exclude noise data from a processing target from the time-series data in the time period on the basis of weather data.

6. A seismic observation method performed by at least one processor of a seismic observation device, the method comprising:
receiving input of time-series data of measurement values of a vibration from one or more sensors;
retrieving a trained model that is trained according to machine learning;
analyzing, by the trained model, the time-series data to determine a time period of the time-series data that is a processing; and
detecting, during the time period, a trigger indicating a vibration different from a normal vibration; and
acquiring, based upon detection of the trigger, a likelihood of classifying a cause of the vibration indicated in the time-series data in the time period, wherein the cause is classified as at least one of a near-field earthquake, a far-field earthquake, a low frequency earthquake, an artificial earthquake, a micro-earthquake, and a volcanic earthquake.

7. A non-transitory computer readable-medium having instructions stored therein, which when executed by a processor in a seismic observation device cause the processor to:
receive input of time-series data of measurement values of a vibration from one or more sensors;
retrieve a trained model that is trained according to machine learning;
analyze, by the trained model, the time-series data to determine a time period of the time-series data that is a processing target;
detect, during the time period, a trigger indicating a vibration different from a normal vibration; and
acquire, based upon detection of the trigger, a likelihood of classifying a cause of the vibration indicated in the time-series data in the time period, wherein the cause is classified as at least one of a near-field earthquake, a far-field earthquake, a low frequency earthquake, an artificial earthquake, a micro-earthquake, and a volcanic earthquake.

* * * * *